United States Patent [19]

Westeppe et al.

[11] Patent Number: 5,010,147

[45] Date of Patent: Apr. 23, 1991

[54] HIGH-STRENGTH POLYCARBONATE MIXTURES

[75] Inventors: Uwe Westeppe, Remscheid; Günther Weymans, Leverkusen; Ulrich Grigo, Kempen; Karsten-Josef Idel; Dieter Freitag, both of Krefeld, all of Fed. Rep. of Germany

[73] Assignee: Bayer Aktiengesellschaft, Leverkusen, Fed. Rep. of Germany

[21] Appl. No.: 471,183

[22] Filed: Jan. 26, 1990

[30] Foreign Application Priority Data

Feb. 1, 1989 [DE] Fed. Rep. of Germany ....... 3902916
Oct. 26, 1989 [DE] Fed. Rep. of Germany ....... 3935639

[51] Int. Cl.$^5$ .............................................. C08L 69/00
[52] U.S. Cl. ..................................... 525/462; 525/461
[58] Field of Search ............................................. 525/462

[56] References Cited

U.S. PATENT DOCUMENTS 3,890,266 6/1975 Serini et al. ................... 260/37 PC
4,237,259 12/1980 Keeley .............................. 528/196

FOREIGN PATENT DOCUMENTS 290836 11/1988 Japan .

OTHER PUBLICATIONS

H. Schnell "Chemistry and Physics of Polycarbonates", Polymer Review, vol. 9, pp. 33 et seq., Interscience Publ., 1964.
"Die Angewandte Makromolekulare Chemie" 55 (1976), pp. 175–189.

*Primary Examiner*—John C. Bleutge
*Assistant Examiner*—David Buttner
*Attorney, Agent, or Firm*—Joseph C. Gil; Aron Preis

[57] ABSTRACT

Mixtures containing
(a) 5 to 70% by weight polycarbonate based on 2-(4-hydroxphenyl)-2-(3-hydroxphenyl)-propane and
(b) 95 to 30% by weight polycarbonate based on bis-2,2-(4-hydroxy-3,5-dimethylphenyl)propane,
the sum of the percentages by weight of components (a)+(b) being 100% by weight.

4 Claims, No Drawings

HIGH-STRENGTH POLYCARBONATE MIXTURES

This invention relates to mixtures containing
(a) 5 to 70% by weight, preferably 10 to 50% by weight and more preferably 15 to 40% by weight polycarbonates based on 2-(4-hydroxyphenyl)-2-(3-hydroxyphenyl)-propane (p,m'-bisphenol A) and
(b) 95 to 30% by weight, preferably 90 to 50% by weight and more preferably 85 to 60% by weight polycarbonate based on bis-2,2-(4-hydroxy-3,5-dimethylphenyl)-propane (tetramethyl bisphenol A), the sum of the percentages by weight of components (a)+(b) being 100% by weight.

Polycarbonates based on p,m'-bisphenol A are those which contain as incorporated diphenols 100 mol-% to 20 mol-%, preferably 100 mol-% to 40 mol-%, more preferably 100 mol-% to 60 mol-% and most preferably 100 mol-%, based in each case on total mols co-condensed diphenols in the polycarbonate, of co-condensed p,m'-bisphenol A and up to 100 mol-%, again based on total mols co-condensed diphenols in the polycarbonate of component (a), of other co-condensed diphenols corresponding to formula (I)

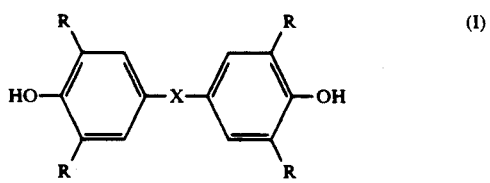

in which X is a single bond, $C_{1-8}$ alkylene, $C_{2-8}$-alkylidene, cycloalkylidene, cycloalkylene, —S—, —O—, —$SO_2$ and

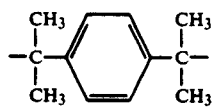

and R=H, $CH_3$, Cl or Br.

Polycarbonates based on p,m'-bisphenol A are therefore both homopolycarbonates and also copolycarbonates of p,m'-bisphenol A.

p,m'-bisphenol A is known (see Jap. application 87/125 928 filed Ma, 25, 1987).

Polycarbonates of p,m'-bisphenol A are also known (see Jap. application 87/125 928) or may be produced by known methods (see, for example, H. Schnell, "Chemistry and Physics of Polycarbonates", Polymer Review, Vol. 9, pages 33 et seq, Interscience Publ., 1964).

Suitable p-m'-bisphenol A polycarbonates have a molecular weight $\overline{M}_w$ (weight average), as determined by gel permeation chromatography in methylene chloride, of more than 5,000 g/mol, preferably in the range from 10,000 to 130,000 g/mol and more preferably in the range from 18,000 to 60,000 g/mol. Their molecular non-uniformity $U=\overline{M}_w/\overline{M}_n-1$, where $M_n$ is the number average molecular weight as determined by gel permeation chromatography, is in the range from 0.05 to 20 and preferably in the range from 0.1 to 10. The molecular weight may have any distribution, bimodal and unimodal distributions being preferred, unimodal distributions being particularly preferred.

Polycarbonates based on tetramethyl bisphenol A are also those which contain as incorporated diphenols 100 mol % to 20 mol-%, preferably 100 mol-% to 40 mol-%, more preferably 100 mol-% to 60 mol-% and most preferably 100 mol-%, based in each case on total mols co-condensed diphenols in the polycarbonate of component (b), of co-condensed bis-2,2-(4-hydroxy-3,5-dimethylphenyl)-propane (tetramethyl bisphenol A) and up to 100 mol-%, again based on total mols co-condensed diphenols in the polycarbonate of component (b), of other co-condensed diphenols corresponding to formula (I).

Polycarbonates based on tetramethyl bisphenol A or bis-2,2-(4-hydroxy-3,5-dimethylphenyl)-propane are therefore both homopolycarbonates and also copolycarbonates of bis-2,2-(4)-hydroxy-3,5-dimethylphenyl)-propane.

The polycarbonates based on tetramethyl bisphenol A to be used in accordance with the invention are also known or may be produced by known methods (see, for example, "Die Angewandte Makromolekulare Chemie" 55 (1976), pages 175–189 and the literature cited therein).

The polycarbonates of component (b) generally have molecular weights $\overline{M}_w$ of more than 15,000 g/mol, preferably in the range from 18,000 to 150,000 g/mol and more preferably in the range from 20,000 to 80,000 g/mol. Their molecular non-uniformity U is also in the range from 0.05 to 20 and preferably in the range from 0.1 to 5. The molecular weight may have any distribution, although unimodal distributions are preferred.

The polycarbonate components (a) and (b) may contain linear, branched or cyclic components. It may even be of advantage to have linear and cyclic constituents present at the same time. However, it is important to keep to the molecular weight ranges.

The molecular weights $\overline{M}_w$ and $\overline{M}_n$ of the polycarbonate components (b), like those of the polycarbonate components (a), are determined in known manner by gel permeation chromatography in methylene chloride.

The mixtures according to the invention show distinctly improved toughness in relation to the two individual polycarbonate components (a) and (b) on their own.

DE-OS 2 248 817 describes mixtures of the polycarbonates based on tetramethyl bisphenol A forming component (b) of the mixtures according to the invention with bisphenol A polycarbonates, which show improved impact strength.

In addition, the mixtures according to the invention are distinguished by particularly high toughness.

The strength of polymers is crucially important to their suitability as manmade materials. Strength is determined by tensile testing. Polymers are tough when they react to tensile stressing by shear yielding and brittle when they react by crazing and breaking. Tough polymers can be extended even further without breaking after the yield stress has been reached (the yield stress being the local maximum of tensile stress in the stress-strain diagram; the tensile stress is always based on the original cross-section of the specimen). The higher the yield stress, the tougher the polymer.

Suitable other diphenols corresponding to formula (I) are, for example,
4,4'-dihydroxydiphenyl, 2,2-bis-(4-hydroxyphenyl)-propane,
2,4-bis-(4-hydroxyphenyl)-propane,
2,4-bis-(4-hydroxyphenyl)-2-methylbutane,
1,1-bis-(4-hydroxyphenyl)-cyclohexane,
α,α'-bis-(4-hydroxyphenyl)-p-diisopropylbenzene,
2,2-bis-(3-methyl-4-hydroxyphenyl)-propane,
2,2-bis-(3-chloro-4-hydroxyphenyl)-propane,
bis-(3,5-dimethyl-4-hydroxyphenyl)-methane,
bis-(3,5-dimethyl-4-hydroxyphenyl)-sulfone,
2,4-bis-(3,5-dimethyl-4-hydroxyphenyl)-2-methylbutane,
1,1-bis-(3,5-dimethyl-4-hydroxyphenyl)-cyclohexane,
α,α-bis-(3,5-dimethyl-4-hydroxyphenyl)-p-diisopropylbenzene,
2,2-bis-(3,5-dichloro-4-hydroxyphenyl)-propane,
2,2-bis-(3,5-dibromo-4-hydroxyphenyl)-propane and
1,1-bis-(4-hydroxyphenyl)-3-methyl cyclohexane.

These diphenols are known from the literature, as are polycarbonates produced therefrom, or may be produced by methods known from the literature.

The polycarbonate mixtures according to the invention of components (a) and (b) may also contain other known polymers in admixture or any of the fillers and additives To prepare the mixtures of (a) and (b), the two constituents may be melted and mixed and the melt subsequently regranulated. However, granulates of the constituents may also be mixed and the granulate mixture directly used for the production of moldings. Extruders, injection-molding machines or screw extruders may be used for this method of production. It is also possible to dissolve (a) and (b) in solvents, to mix the solutions and to remove the solvent by evaporation. Films may also be directly produced from the solutions obtained in this way. Films may also be produced by the conventional film blowing process. Virtually any of the processes normally used for molding and processing thermoplastics may be used.

The other polymers mentioned above or the fillers or additives may be incorporated as described above by basically known methods.

Moldings, for example housings, may be produced from the mixtures according to the invention. They may also be used as substrates for optical discs or, in the form of films, as a packaging material. They may be used for any applications where polycarbonate molding compounds of particularly high strength are used.

EXAMPLES

Substance 1

Polycarbonate of the p-m'-isomer of bisphenol A

The bisphenol is obtainable from Mitsui Petrochemical Industries Ltd., Japan. The p-m'-bisphenol A polycarbonate is produced from the bisphenol in accordance with H. Schnell, "Chemistry and Physics of Polycarbonates", Polymer Review, Vol. 9, pages 33 et seq. Interscience Publ. 1964. The substance has a molecular weight $\overline{M}_w$, as measured by gel permeation chromatography of 38,000 and a glass transition temperature of 109° C., as measured by the DSC method (differential scanning calorimetry) at a heating rate of 20 K/minute.

Substance 2

Polycarbonate of tetramethyl bisphenol A corresponding to the following formula

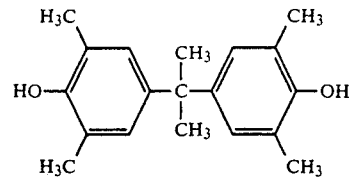

prepared in accordance with H. Schnell, "Chemistry and Physics of Polycarbonates", Polymer Review, Vol. 9, pages 33 et seq. Interscience Publ. 1964; $\overline{M}_w=39,300$; glass transition temperature (measured in the same way as for substance 1): 197° C.

Substance 3

As substance 2, but with $\overline{M}_w=27,100$ g/mol.

Substance 4

As substance 1, but with $\overline{M}_w=37,800$ and $\overline{M}_w=7,900$ g/mol.

Substance 5

Bisphenol A polycarbonate with $\overline{M}_w=28,000$ g/mol obtained by the method described for substance 2. Glass transition temperature as measured by DSC: 145° C.

Measurements

Comparisons

1. The yield stress of substance 5 was measured in air at room temperature using a standard tensile testing machine (crosshead speed 2 mm/minute) and an S2 standard bar. It measured 55 MPa. The standard bar was produced as follows: substance 5 was dried after purification and then conditioned for 5 minutes at 220° C. Substance 5 thus treated was then press-molded for 5 minutes under a pressure of 200 bar at the same temperature.

2. Substance 2 was conditioned for 5 minutes at 280° C. and then press-molded for 5 minutes under a pressure of 200 bar to form an S2 standard bar. Tensile strength was measured as in Example 1. Since the material showed brittle fracture, it was only possible to measure maximum stress and not the yield stress. It measured 36 MPa.

3. Quantities of 5 g of substances 2 and 5 were dissolved with stirring in a methylene chloride solution. The solution was then thickened. After drying in vacuo at 70° C., the transparent resin mass was measured for its glass temperature by DSC. A value of 171° C. was obtained. After conditioning for 5 minutes at 280° C., the mass was press-molded for 5 minutes under a pressure of 200 bar at the same temperature to form an S2 test bar. The yield stress was measured as in Comparison Example 1. Result: 53 MPa.

4. Substance 1 is press-molded as in Comparison Example 3, but at 172° C., to form an S2 test bar. The yield stress measures 57 MPa.

Invention

1. A mass was prepared as in Comparison 1 from a mixture of substance 1 and substance 2 in a ratio by weight of 1:1 and press-molded to form a test bar. The yield stress measured 65 MPa.

2. A mass was prepared as in Comparison 1 from a mixture of substance 1 and substance 3 in a ratio by weight of 1:1 and press-molded to form a test bar. A yield stress of 64.5 MPa is obtained.

3. 5 g of substance 1 and 15 g of substance 2 were mixed as in Comparison 1 and a test bar was press-molded from the resulting mixture. A yield stress of 71 MPa is obtained.

4. 5 g of substance 1 and 15 g of substance 3 were mixed as in Comparison 1 and a test bar press-molded from the resulting mixture. A yield stress of 69.5 MPa is obtained. 5. 5 g of substance 1 and 15 g of substance 4 were mixed as in Comparison 1 and a test bar press-molded from the resulting mixture. A yield stress of 68.6 MPa is obtained.

I claim:

1. Mixtures containing
   (a) 5 to 70% by weight polycarbonate based on 2-(4-hydroxyphenyl)-2-(3-hydroxyphenyl)-propane and
   (b) 95 to 30% by weight polycarbonate based on bis-2,2-(4-hydroxy-3,5-dimethylphenyl)-propane,
   the sum of the percentages by weight of components (a)+(b) being 100% by weight.

2. Mixtures as claimed in claim 1, wherein (a) has an (b) of 10,000 to 130,000 g/mol and (b) has an $\overline{M}_w$ of 18,000 to 150,000 g/mol.

3. Mixtures as claimed in claim 1, wherein (a) and (b) have a molecular non-uniformity of 0.05 to 20.

4. Moldings of the mixtures claimed in claim 1.

* * * * *